United States Patent Office 3,576,920
Patented Apr. 27, 1971

3,576,920
PHOSPHITES CONTAINING MORE THAN TWO HYDROGENATED PHENOLIC GROUPS
Lester Friedman, Beachwood, Ohio, assignor to Weston Chemical Corporation, New York, N.Y.
No Drawing. Filed Aug. 2, 1968, Ser. No. 749,567
Int. Cl. C07f 9/08
U.S. Cl. 260—930
19 Claims

ABSTRACT OF THE DISCLOSURE

Compounds are prepared having one of the formulae (1) 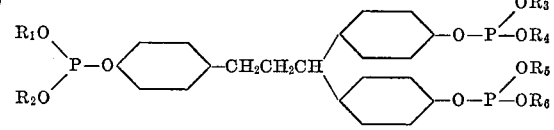

(2) 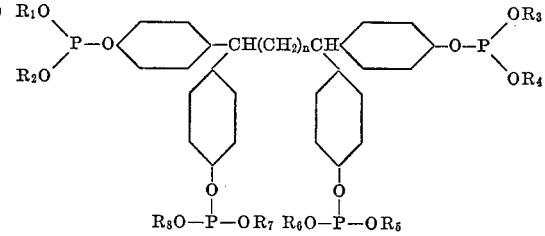

and (3) 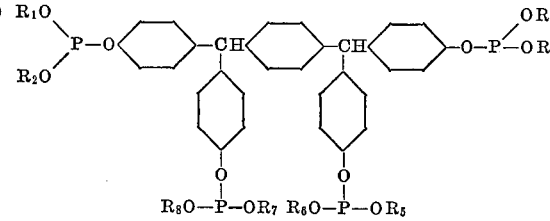

$R_1$, $R_2$, $R_3$, $R_4$, $R_5$, $R_6$, $R_7$ and $R_8$ are alkyl, aryl, alkenyl, haloaryl, or the monovalent residue of a dihydric phenol or hydrogenated dihydric phenol and $n$ is an integer from 0 to 10. Preferably at least one of the R groups, and most preferably all of the R groups are residues of hydrogenated dihydric phenols. At least one, but not all of the

groups can be replaced by hydrogen.

The compounds are useful as stabilizers for halogen containing polymers, hydrocarbon polymers, hydrocarbon oils, foodstuffs, etc. Those compounds having free hydroxyl groups can be used as reactive stabilizers for polyurethanes and polyesters.

---

The present invention relates to novel phosphites.

It is an object of the present invention to prepare novel phosphites.

Another object is to develop novel stabilizers for hydrocarbon polymers, halogen containing polymers, natural and synthetic rubbers and other polymers.

A more specific object is to prepare stabilizers for rigid polyvinyl chloride resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphites having one of the formulae (1) 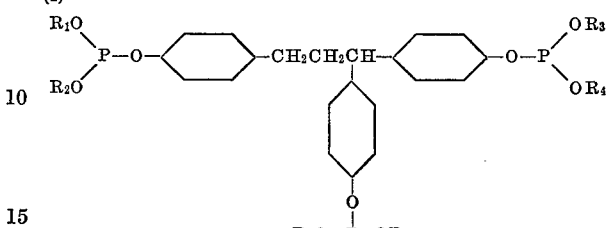

(2) 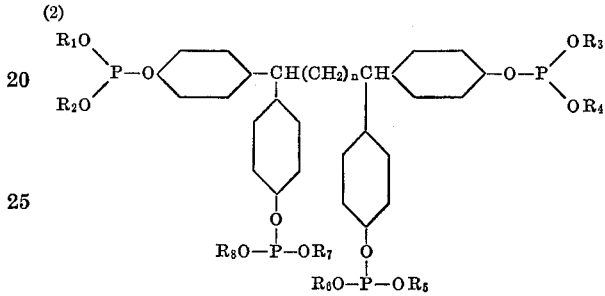

and (3) 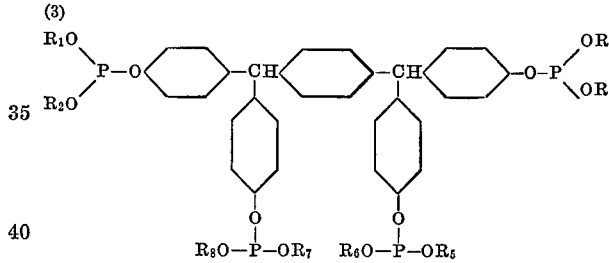

where $R_1$, $R_2$, $R_3$, $R_4$, $R_5$, $R_6$, $R_7$ and $R_8$ are alkyl, aryl, alkenyl, haloaryl or the monovalent residue of a dihydric phenol or hydrogenated dihydric phenol and $n$ is an integer from 0 to 10, e.g., 0, 2, 3, 4, 5, 6 or 10. At least one but not all

groups can be replaced by hydrogen. Preferably at least one of the R groups is a residue of a hydrogenated dihydric phenol and most preferably all of the R groups are such a residue.

The compounds are useful as high molecular weight stabilizers for halogen containing resins such as vinyl chloride resins, hydrocarbon polymers such as monoolefin polymers including polypropylene, polyethylene, ethylene-propylene copolymers and terpolymers, natural rubber, synthetic rubbers, e.g. cis isoprene polymer, butadiene-styrene copolymer (SBR rubber) and rubbery and resinous acrylonitrile-butadiene-styrene copolymers. They are also useful for stabilizing hydrocarbon oils and foodstuffs. The compounds having free hydroxyl groups can be used as a reactant in making polyurethanes and polyesters. They also impart heat and light stability to such polymers.

The compounds having hydrogenated dihydric phenol residues and particularly those having residue of hydrogenated Bisphenol A are excellent stabilizers for rigid polyvinyl chloride resins.

As used in the present specification and claims the symbol

represents the carbocyclic benzene ring and the symbol

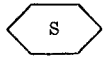

indicates that the ring is completely saturated.

The compounds of the present invention are prepared by reaction of a compound having one of the formulae (4) 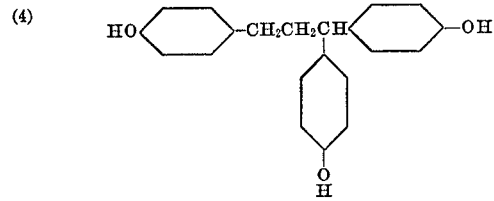

(5) 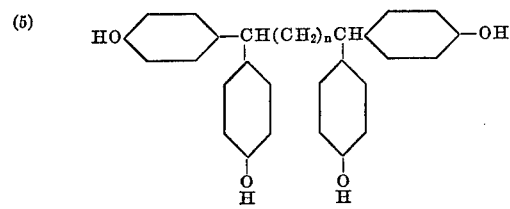

or (6) 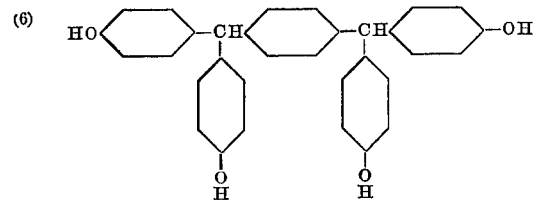

with either (a) PCl$_3$ and the appropriate monohydric phenol, dihydric phenol, monohydric alcohol or hydrogenated dihydric phenol or (b)

(7) 

where R$_9$, R$_{10}$ and R$_{11}$ are alkyl, alkenyl, aryl, haloaryl or haloalkyl, or (c) 

and a dihydric phenol or hydrogenated dihydric phenol or a monohydric alcohol or phenol boiling higher than the R$_9$OH, R$_{10}$OH or R$_{11}$OH compound formed.

To make the compounds of Formula 1 there is reacted 1 mole of a compound of Formula 4 with either (a) 3 moles of a compound of Formula 7 and there are removed 3 moles of R$_9$OH, R$_{10}$OH and R$_{11}$OH or (b) with 3 moles of a compound of Formula 7 and then with 6 moles or a slight excess, e.g. 6.2 moles, of a dihydric phenol, hydrogenated dihydric phenol or monohydric phenol or alcohol boiling higher than the R$_9$OH, R$_{10}$OH and R$_{11}$OH or (c) with 3 moles of PCl$_3$ and 6 moles of the appropriate phenol or alcohol and removing 9 moles of HCl. Mixed phosphites are prepared in (a) if R$_9$, R$_{10}$ and R$_{11}$ are different. Mixed phosphites are prepared in reaction (b) if 1 mole but less than 6 moles of the dihydric phenol or hydrogenated dihydric phenol or higher boiling alcohol or phenol are employed. Mixed phosphites are prepared in reaction (c) if a mixture of alcohols and/or phenols are employed.

If the total moles of monohydric phenol or alcohol liberated is at least 1 but not over 2 for each mole of compound of Formula 4 then in reactions (a), (b) or (c) the product (compound(1)) will have 1 or 2 hydroxyl groups on the compound (4) residues.

The compounds of Formulae 2 and 3 are made in similar fashion with appropriate adjustment of proportions. Thus the compounds of Formulae 2 and 3 are prepared by reacting 1 mole of a compound of Formula 5 or 6 with either (a) 4 moles of a compound of Formula 7 and the removal of 4 moles of R$_9$OH, R$_{10}$OH and R$_{11}$OH or (b) with 4 moles of a compound of Formula 7 and then with 8 moles of a dihydric phenol, hydrogenated dihydric phenol, or high boiling monohydric phenol or alcohol and removing 12 moles total of R$_9$OH, R$_{10}$OH and R$_{11}$OH or (c) with 4 moles of PCl$_3$ and 8 moles of the appropriate phenol or alcohol and removing 12 moles of HCl. If the total moles of monohydric phenol or alcohol liberated is at least 1 but not over 3 for each mole of compound of Formula 5 or 6 then in reactions (a), (b) or (c) the product (compound (2) and (3)) will have 1, 2 or 3 free hydroxyl groups on the compound 5 or (6) residue.

The starting compounds of Formulae 4, 5 and 6 are known compounds and are readily available. Thus the compound of Formula 4 is prepared from 1 mole of acrolein and 3 moles of phenol while the compounds of Formulae 5 and 6 are made from 1 mole of the appropriate dialdehyde such as glyoxal, succinaldehyde, glutaraldehyde, adipaldehyde, sebacaldehyde, suberaldehyde, 1,10-decanedialdehyde or terephthaldehyde with 4 moles of phenol. The compounds of Formulae 4, 5 and 6 include 1,1,3 - tri (4 - hydroxyphenyl) propane, 1,1,2,2-tetra (4 - hydroxyphenyl) ethane, 1,1,4,4 - tetra (4-hydroxyphenyl) butane, 1,1,5,5 - tetra (4 - hydroxyphenyl) pentane, 1,1,6,6 - tetra (4-hydroxyphenyl) hexane, 1,1,7,7-tetra (4 - hydroxyphenyl) heptane, 1,1,8,8 - tetra (4-hydroxyphenyl) octane, 1,1,10,10 - tetra (4-hydroxyphenyl) decane, 1,1,12,12 - tetra (4 - hydroxyphenyl) dodecane, 1 - (di (4' - hydroxyphenyl)) methyl-4-(di(4'-hydroxyphenyl))methyl benzene.

As compounds having Formula 7 there can be used trimethyl phosphite, triethyl phosphite, triisopropyl phosphite, tributyl phosphite, trihexyl phosphite, tricyclohexyl phosphite, tris decyl phosphite, tris isodecyl phosphite, diphenyl decyl phosphite, triallyl phosphite, tris dodecyl phosphite, tristearyl phosphite, trioleyl phosphite, methyl distearyl phosphite, methyl dioleyl phosphite, methyl dilauryl phosphite, methyl dihexadecyl phosphite, diethyl stearyl phosphite, triphenyl phosphite, tri p-cresyl phosphite, tri o-cresyl phosphite, tri-(4-dodecyl phenyl) phosphite, tri (t-amylphenyl) phosphite, tris (alpha naphthyl) phosphite, tri (2-chlorophenyl) phosphite, tri 4-(bromophenyl phosphite), tri (2,4 - dichlorophenyl) phosphite, tris (2 - chloroethyl) phosphite, tri (2-chloroisopropyl) phosphite, tris (2 - bromoethyl) phosphite, tris (o-cyclohexylphenyl) phosphite, tris (2 - fluorophenyl) phosphite, tris (4 - t-butylphenyl) phosphite, tris octyl phosphite, tris isooctyl phosphite, diphenyl 4 - methylphenyl phosphite.

Starting alcohols and phenols include methyl alcohol, ethyl alcohol, isopropyl alcohol, butyl alcohol, sec. amyl alcohol, cyclohexyl alcohol, hexyl alcohol, octyl alcohol, isooctyl alcohol, decyl alcohol, isodecyl alcohol, dodecyl alcohol, hexadecyl alcohol, octadecyl alcohol, eicosanyl alcohol, allyl alcohol, crotyl alcohol, oleyl alcohol, linoleyl alcohol, phenol, o-cresol, p-cresol, m-cresol, 2,4-xylenol, 2,5 - xylenol, 4 - butylphenol, p-t-amylphenol, 2 - octylphenol, 4 - decylphenol, 4 - dodecylphenol, 4-octadecylphenol, 4 - allylphenol, p - chlorophenol, p-fluorophenol, 2,4 - dichlorophenol, pentachlorophenol, 4 - bromophenol, p - nonylphenol, 2,4 - dinonylphenol, Bisphenol A (2,2 - bis(4 - hydroxyphenyl)propane), di-(4 - hydroxyphenyl)methyl ethyl methane, di(4-hydroxyphenyl)methane, p,p - diphenol(bisphenol), bis(2-hydroxyphenyl)dimethyl methane, hydroquinone, di(3-methyl - 4 - hydroxyphenyl)dimethyl methane, di(3-methyl - 4-hydroxyphenyl)methyl methane, di(3-methyl- 4 - hydroxyphenyl)phenyl methane, di(4 - hydroxyphenyl) sulfone, di(4 - hydroxyphenyl)sulfide, di(3 - hydroxyphenyl) dimethyl methane, 4,4' - methylene bis(2-methyl - 6 - t-butylphenol), di(4-hydroxyphenyl)ether, resorcinol, di(3 - chloro - 4 - hydroxyphenyl)dimethyl methane, tetrachloro Bisphenol A (di(dichlorohydroxyphenyl)dimethyl methane).

As used in the present specification and claims the term hydrogenated dihydric phenol signifies that all of the aromatic double bonds have been completely hydrogenated. Examples of hydrogenated dihydric phenols used to form the products of the present invention are 4,4'-isopropylidene dicyclohexanol (also called bis(4-hydroxycyclohexyl) dimethyl methane or hydrogenated Bisphenol A), di(4 - hydroxycyclohexyl)methyl ethyl methane, di(4-hydroxycyclohexyl)methane, di(4-hydroxycyclohexyl), bis(2-hydroxycyclohexyl)dimethyl methane, 1,4-dihydroxycyclohexane, di(4-hydroxy-3-methylcyclohexyl) dimethyl methane, di(4-hydroxy-3-methylcyclohexyl) methyl methane, di(4-hydroxy-3-methylcyclohexyl)cyclohexyl methane, di(4-hydroxycyclohexyl)sulfone, di(4-hydroxy cyclohexyl)sulfide, di(3 - hydroxycyclohexyl)dimethyl methane, 4,4'-methylene bis(2-methyl-6-t-butylcyclohexanol), di(4-hydroxycyclohexyl)ether, 1,3 - dihydroxycyclohexane, di(3 - chloro-4-hydroxycyclohexyl)dimethyl methane.

The preferred starting hydrogenated dihydric phenols are hydrogenated bisphenols, the most preferred being hydrogenated Bisphenol A.

While the above phosphite forming reactions can be carried out at atmospheric pressure or super atmospheric pressure they are preferably carried out in a vacuum, e.g. 0.1 to 100 mm. pressure, usually at 5–15 mm. pressure, at the boiling point of the monohydric alcohol or monohydric phenol which is being removed.

Unless otherwise indicated all parts and percentages are by weight.

The reactions set forth above are all preferably catalyzed with 0.1 to 5% based on the weight of the phosphite reactant or reactants of a catalyst which usually is a phosphite, e.g. a dialkyl phosphite, a diaryl phosphite or a dihaloaryl phosphite or an alkaline catalyst. Examples of suitable catalysts are diphenyl phosphite, di(2-methylphenyl)phosphite, di(4-dodecylphenyl)phosphite, di(4-octadecylphenyl)phosphite, di(2-chlorophenyl)phosphite, di(2,4-dimethylphenyl)phosphite, di(4-bromophenyl)phosphite, diethyl phosphite, dicyclohexyl phosphite, phenyl 3-methylphenyl phosphite, dioctadecyl phosphite, dimethyl phosphite, sodium phenolate, sodium decylate, potassium p-cresylate, sodium ethylate, sodium octadeconolate, sodium hydride, sodium metal, potassium metal, lithium methylate, sodium cetylate, trimethyl benzyl ammonium hydroxide and other quaternary ammonium hydroxides, sodium hydroxide, potassium hydroxide, calcium ethylate, sodium methylate, guanidines, e.g. pentamethyl guanidine.

The compounds of the present invention with Formula 1 include hexa(hydrogenated Bisphenol A)triphenylpropane triphosphite, tetra(hydrogenated Bisphenol A)diphenyl hydroxyphenyl propane diphosphite, di(hydrogenated Bisphenol A)phenyl di(hydroxyphenyl)propane monophosphite, penta(hydrogenated Bisphenol A)phenyl triphenylpropane triphosphite, tetra(hydrogenated Bisphenol A)diphenyl triphenylpropane triphosphite, penta(hydrogenated Bisphenol A)decyl triphenylpropane triphosphite, penta(hydrogenated Bisphenol A)p-nonylphenyl triphenylpropane triphosphite, hexa(di-(4-hydroxycyclohexyl)methyl ethyl methane)triphenylpropane triphosphite, hexa(di - (4 - hydroxycyclohexyl)methane)triphenylpropane triphosphite, hexa(di-(4-hydroxycyclohexyl))triphenylpropane triphosphite, hexa(bis-(2-hydroxycyclohexyl)dimethyl methane) triphenylpropane triphosphite, hexa(1,4 - dihydroxycyclohexane)triphenylpropane triphosphite, hexa(di - (4-hydroxy-3-methylcyclohexyl)dimethyl methane)triphenylpropane triphosphite, hexa(di - (4 - hydroxycyclohexyl)sulfide)triphenylpropane triphosphite, hexa(di-(4-hydroxycyclohexyl)ether)triphenylpropane triphosphite, hexa(di-(3-chloro-4-hydroxycyclohexyl)dimethyl methane)triphenylpropane triphosphite, hexa-(4,4'-methylene bis-(2-methyl-6-t-butylcyclohexanol))triphenylpropane triphosphite, hexaphenyl triphenylpropane triphosphite, hexa-(p-nonylphenyl)triphenylpropane triphosphite, tetraphenyl triphenylpropane diphosphite, diphenyl tetra(p-nonylphenyl)triphenylpropane diphosphite, hexa(2-methylphenyl)triphenylpropane triphosphite, hexa stearyl triphenylpropane triphosphite, hexa eicosanyl triphenylpropane triphosphite, hexaoleyl triphenylpropane triphosphite, hexa(cyclohexyl)triphenylpropane triphosphite, hexa(isodecyl)triphenylpropane triphosphite, hexa-(p-dodecylphenyl)triphenylpropane triphosphite, tetra stearyl dioctyl triphenylpropane triphosphite, hexa(4-chlorophenyl)triphenylpropane triphosphite, hexa(2,4-dichlorophenyl)triphenylpropane triphosphite, hexa(3-bromophenyl)triphenylpropane triphosphite, hexamethyl triphenylpropane triphosphite, hexa(2,4-dinonylphenyl)triphenylpropane triphosphite.

The compounds of the invention within Formula 2 include octa(hydrogenated Bisphenol A)tetraphenylethane tetraphosphite, octa(hydrogenated Bisphenol A)tetraphenylbutane tetraphosphite, octa(hydrogenated Bisphenol A) tetraphenylpentane tetraphosphite, octa(hydrogenated Bisphenol A)tetraphenylhexane tetraphosphite, octa(hydrogenated Bisphenol A)tetraphenyloctane tetraphosphite, octa(hydrogenated Bisphenol A)tetraphenyldecane tetraphosphite, octa(hydrogenated Bisphenol A)tetraphenyldodecane tetraphosphite, hexa(hydrogenated Bisphenol A) triphenyl hydroxyphenyl pentane triphosphite, di(hydrogenated Bisphenol A)phenyl tri(hydroxyphenyl)pentane monophosphite, hexa(hydrogenated Bisphenol A) di(isodecyl)tetraphenylpentane tetraphosphite, hexa(hydrogenated Bisphenol A)diphenyl tetraphenylpentane tetraphosphite, octa(cyclohexyl)tetraphenylpentane tetraphosphite, octa(di-(4-hydroxycyclohexyl)methyl ethyl methane)tetraphenylpentane triphosphite, octa(di-(4-hydroxycyclohexyl)methane tetraphenylpentane tetraphosphite, octa(1, 4 - dihydroxycyclohexane)tetraphenylpentane tetraphosphite, octa(di - 4 - hydroxy-3-methylcyclohexyl)dimethyl methane)tetraphenylpentane tetraphosphite, octa(di-(4-hydroxycyclohexyl)ether)tetraphenylpentane tetraphosphite, octaphenyl tetraphenylpentane tetraphosphite, octa (p-nonylphenyl)tetraphenylpentane tetraphosphite, hexa-(p - methylphenyl)tetraphenylpentane triphosphite, octa stearyl tetraphenylpentane tetraphosphite, octa oleyl tetraphenylpentane tetraphosphite, octa(decyl)tetraphenylpentane tetraphosphite, octa(2-chlorophenyl)tetraphenylpentane tetraphosphite.

The compounds of the invention within Formula 3 include octa (hydrogenated Bisphenol A) tetraphenyl xylylene tetraphosphite, tetra (hydrogenated Bisphenol A) diphenyl di (hydroxyphenyl) xylylene diphosphite, hepta (hydrogenated Bisphenol A) phenyl tetraphenyl xylylene tetraphosphite, hexa (hydrogenated Bisphenol A) di (isodecyl) tetraphenyl xylylene tetraphosphite, octa (di (4-hydroxycyclohexyl) methyl ethyl methane) tetraphenyl xylylene tetraphosphite, octa (di (4-hydroxycyclohexyl) methane) tetraphenyl xylylene tetraphosphite, octa (di (4-hydroxycyclohexyl) tetraphenyl xylylene tetraphosphite, octa (bis (2-hydroxycyclohexyl) dimethyl methane) tetraphenyl xylylene tetraphosphite, octa (1,4-dihydroxycyclohexane) tetraphenyl xylylene tetraphosphite, octa (di (4-hydroxycyclohexyl sulfone) tetraphenyl xylylene tetraphosphite, octaphenyl tetraphenyl xylylene tetraphosphite, octa (p-nonylphenyl) tetraphenyl xylylene tetraphosphite, tetraphenyl tetra (p-nonylphenyl) tetraphenyl xylylene tetraphosphite, octa stearyl tetraphenyl xylylene tetraphosphite, octa (eicosanyl) tetraphenyl xylylene tetraphosphite, octa oleyl tetraphenyl xylylene tetraphosphite, octa octyl tetraphenyl xylylene tetraphosphite, octa (3,5-dichlorophenyl) tetraphenyl xylylene tetraphosphite, octa ethyl tetraphenyl xylylene tetraphosphite, octa (2,4-dinonylphenyl) tetraphenyl xylylene tetraphosphite.

The compounds of the present invention range from pale viscous liquids to substantially colorless solids. The hydrogenated Bisphenol A products in general are solids, the phenol derivatives are normally low melting solids and the p-nonylphenol derivatives are usually viscous liquids. They are useful as heat and light stabilizers and antioxidants.

They can be readily ground for incorporation in an amount of 0.01 to 20% into various polymers such as halogen containing resins, e.g. vinyl chloride resins, as stabilizers against heat and light or as antioxidants. They are particularly useful in stabilizing rigid polyvinyl chloride resins where many other phosphites are unsuitable.

Examples of halogenated polymers which can be stabilized with the phosphites of the present invention include chlorinated polyethylene having about 14 to about 75%, e.g., 27% chlorine, polyvinyl chloride, polyvinylidene chloride, polyvinyl bromide, polyvinyl fluoride, polyvinylidene fluoride, polytetrafluoroethylene, copolymers of vinylidene chloride with acrylonitrile (e.g. 80:20) or vinyl chloride (e.g. 85:15), copolymers of vinyl chloride with 1 to 90%, preferably 1 to 40%, by weight of copolymerizable materials such as vinyl acetate, vinylidene chloride, vinylidene diethyl fluoride, diethyl fumarate, diethyl maleate and other alkyl fumarates and maleates, vinyl propionate, methyl acrylate, ethyl acrylate, butyl acrylate, 2-ethylhexyl acrylate and other alkyl acrylates, methyl methacrylate, butyl methacrylate and other methacrylates, methyl alpha chloroacrylate, styrene, vinyl ethyl ether, vinyl methyl ketone, acrylonitrile, allylidene diacetate, trichloroethylene, etc. Typical copolymers include vinyl chloride-vinyl acetate (96:4), vinyl chloride-vinyl acetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-acrylonitrile (60:40), vinyl chloride-2-ethylhexyl acrylate (80:20). They can also be used to stabilize resins where the halogen containing component is present in minor amount, e.g. acrylonitrile-vinyl chloride copolymer (85:15) or halogenated rubbers e.g. polychloroprene, chlorinated polyisobutylene, chlorinated natural rubber, chlorine containing polyurethanes, etc.

As is conventional in the art when the novel phosphites are employed with halogen containing resins there can be added barium, cadmium and zinc salts and synergistic activity is noted in this connection. Thus there can be included 0.5 to 10% of salts such as mixed barium-cadmium laurate, barium laurate, cadmium laurate, zinc stearate, cadmium 2-ethylhexoate, barium nonylphenylate, barium octylphenolate, barium stearate, zinc octoate.

There can also be incorporated in the vinyl chloride resins and the like 0.5 to 10% of organotin compounds, particularly sulfur containing compounds such as dibutyltin bis (octylthioglycollate).

Conventional phenolic antioxidants can also be incorporated in an amount of 0.1 to 10%, e.g. 2,2-methylene bis (4-methyl-6-t-butylphenol), 2,4,6-tri-t-butylphenol, 4,4'-isopropylidenephenol, etc.

The novel phosphites of the present invention can also be incorporated in an amount of 0.01 to 20% as stabilizers for hydrocarbon polymers including monoolefin polymers such as polyethylene, polypropylene, ethylene-propylene copolymer (e.g. 80:20, 50:50, 20:80), ethylene-propylene terpolymers, e.g. ethylene-propylene cyclooctadiene terpolymer, ethylene-butene-1 copolymer, ethylene-decene-1 copolymer, polystyrene, polyolefin, e.g. diolefin polymers such as natural rubber, rubbery butadiene styrene copolymer (75:25, 60:40) cis isoprene polymer, polybutadiene, polyisobutylene, isobutylene-butadiene copolymer (butyl rubber, e.g. 97:3, 98.5:1.5). There can also be stabilized ABS rubbers and resins (acrylonitrile-butadiene-styrene terpolymers, e.g. 50:40:10).

They can be used in an amount of 0.01 to 20% to stabilize polyurethanes (e.g. from toluene diisocyanate and polypropylene glycol molecular weight 2025), polyesters, e.g. Dacron (polyethylene terephthalate), polymeric tetramethylene terephthalate-isophthalate-sebacate, or unsaturated polyesters, e.g. ethylene glycol-propylene glycol adipate-maleate molecular weight 5000 and the corresponding polymer modified with 10% styrene, nylon, e.g. polyhexamethylene adipamide, Delrin (polymerized oxymethylene) and Celcon (oxymethylene copolymer), polyvinyl butyral, polysulfones from conjugated diolefins, sulfur dioxide and a monoethylenically unsaturated compound, e.g. a terpolymer of butadiene, sulfur dioxide and styrene as set forth in Example 1 of Mostert Patent 3,377,324, polycarbonate, e.g. the reaction product of Bisphenol A with phosgene or diphenyl carbonate as well as other polycarbonates set forth in Fritz Patent 3,305,520.

When incorporated in hydrocarbon polymers it is frequently advantageous to add conventional phenolic antioxidants as set forth above and conventional additives such as dilauryl thiodipropionate.

They are also useful as stabilizers for foods, oils, lubricants, and other products which deteriorate on oxidation.

The compounds of the invention are also useful as flame and fire proofing additives in polyurethane, hydrocarbon polymers, cellulose esters and ethers, e.g. cellulose acetate, methyl cellulose, ethyl cellulose, cellulose acetatepropionate, etc.

The field of greatest utility at the moment, however, appears to be as stabilizers for rigid vinyl chloride resins. Since the compounds of the present invention are monomeric with readily defined structures it is surprising that they will act as stabilizers for rigid vinyl chloride resins since the only phosphites previously found to satisfactorily stabilize rigid polyvinyl chloride are polymeric phosphites. The rigid polyvinyl chloride resins normally do not contain over 10% plasticizer and can be completely devoid of plasticizer.

Unless otherwise indicated all parts and percentages are by weight. The term moles as used in the specification is in gram molecular weights.

EXAMPLE 1

1 mole of 1,1,3-tri (4-hydrophenyl) propane, 3 moles of triphenyl phosphite and 10 grams of diphenyl phosphite were subjected to vacuum distillation at 10 mm. until 3 moles of phenol were removed. The product remaining in the pot was hexaphenyl triphenylpropane triphosphite, a low melting solid.

EXAMPLE 2

1 mole of 1,1,3-tri (4-hydroxyphenyl) propane, 3 moles of tris isodecyl phosphite and 15 grams of di (isodecyl) phosphite were subjected to vacuum distillation at 10 mm. until 3 moles of isodecyl alcohol were removed. The product remaining in the pot was hexa (isodecyl) triphenylpropane triphosphite, a low melting solid.

EXAMPLE 3

1 mole of 1,1,5,5-tetra (4-hydroxyphenyl) pentane, 4 moles of triphenyl phosphite and 10 grams of diphenyl phosphite were subjected to vacuum distillation at 10 mm. until 4 moles of phenol were removed. The product remaining in the pot was octaphenyl tetraphenylpentane tetraphosphite, a low melting solid.

EXAMPLE 4

1 mole of 1,1,5,5-tetra (4-hydroxyphenyl) pentane, 4 moles of tris octyl phosphite and 11 grams of dioctyl phosphite were subjected to vacuum distillation at 10 mm. until 4 moles of octyl alcohol were removed. The product remaining in the pot was octa octyl tetraphenylpentane tetraphosphite.

EXAMPLE 5

1 mole of 1 - di (4' - hydroxyphenyl) methyl - 4 - (di-(4-hydroxyphenyl)) methyl benzene, 4 moles of triphenyl phosphite and 14 grams of diphenyl phosphite were subjected to vacuum distillation at 10 mm. until 4 moles of phenol were removed. The residue remaining in the pot was octaphenyl tetraphenyl xylylene tetraphosphite, a low melting solid.

EXAMPLE 6

1 mole of 1,1,5,5-tetra (4-hydroxyphenyl) pentane, 2 moles of triphenyl phosphite and 7 grams of diphenyl phosphite were subjected to vacuum distillation at 10 mm. until 2 moles of phenol were removed. The residue remaining in the pot was tetraphenyl diphenyl hydroxyphenyl propane diphosphite, a low melting solid.

EXAMPLE 7

To 1 mole of the product of Example 1 and 10 grams of diphenyl phosphite there were added 6.1 moles of hydrogenated Bisphenol A and the mixture heated in a vacuum at 10 mm. until 6 further moles of phenol were removed (9 moles of phenol in all were thus removed). The solid residue in the pot was hexa (hydrogenated Bisphenol A) triphenylpropane triphosphite.

EXAMPLE 8

To 1 mole of the product of Example 1 and 10 grams of diphenyl phosphite there were added 4 moles of hydrogenated Bisphenol A and the mixture heated in a vacuum at 10 mm. until 4 further moles of phenol were removed. The solid residue in the pot was tetra (hydrogenated Bisphenol A) diphenyl triphenylpropane triphosphite.

EXAMPLE 9

To 1 mole of 1,1,3-tri (4-hydroxyphenyl) propane, 3 moles of $PCl_3$ there were added 6.2 moles of p-nonylphenyl and the mixture heated in a vacuum until 9 moles of HCl were removed. The residue in the pot was hexa (p-nonylphenyl) triphenylpropane triphosphite, a viscous liquid. A small amount of unreacted p-nonylphenol (about 0.2 mole) was also left in the pot.

EXAMPLE 10

1 mole of 1,1,5,5-tetra (4-hydroxyphenyl) pentane, 4 moles of trimethyl phosphite, 10 grams of dioleyl phosphite and 8.1 moles of oleyl alcohol were heated under a vacuum which eventually reached 10 mm. until 12 moles of methyl alcohol were removed. The solid residue in the pot was octa (oleyl) tetraphenylpentane tetraphosphite.

EXAMPLE 11

1 mole of 1,1,3-tri (4-hydroxyphenyl) propane, 3 moles of trimethyl phosphite, 6.1 moles of stearyl alcohol and 7 grams of sodium octadecanoate were heated under a vacuum which eventually reached 10 mm. until 9 moles of methyl alcohol were removed. The solid residue in the pot was octa (stearyl) tetraphenylpentane tetraphosphite.

EXAMPLE 12

To 1 mole of the product of Example 4 and 11 grams of dioctyl phosphite there were added 8.1 moles of hydrogenated Bisphenol A and the mixture heated in a vacuum at 10 mm. until 8 further moles of octyl alcohol were removed (12 moles of octyl alcohol were thus removed including that in Example 4). The solid residue in the pot was octa (hydrogenated Bisphenol A) tetraphenylpentane tetraphosphite.

EXAMPLE 13

To 1 mole of the product of Example 5 and 14 grams of diphenyl phosphite there were added 8 moles of hydrogenated Bisphenol A and the mixture heated in a vacuum at 10 mm. until 8 further moles of phenol were removed (12 moles of phenol were thus removed including that in Example 5). The solid residue in the pot was octa (hydrogenated Bisphenol A) tetraphenyl xylylene tetraphosphite.

EXAMPLE 14

| | Parts |
|---|---|
| Type 1 rigid polyvinyl chloride (QYSJ) | 100 |
| Calcium-zinc stearate (1:1 mixture) | 2 |
| Epoxidized soyabean oil | 3 |
| Stearic acid (processing aid) | 0.5 |
| Phosphite of Example 7 | 0.8 |

This mixture was extruded in the form of a parison and a bottle blow molded therefrom. The bottle was water white and perfectly clear and showed good heat and light stability.

Similar results were obtained when (a) the phosphite prepared in Example 12 and (b) the phosphite prepared in Example 13 were substituted for the phosphite prepared in Example 7 in the procedure of Example 14.

EXAMPLE 15

2 parts of the phosphite prepared in Example 7, 1 part of dioleyl thiodipropionate and 1 part of 2,2-methylene bis (4-methyl-6-t-butylphenol) were mixed with 100 parts of polypropylene (melt index 0.8) to give a stabilized product.

EXAMPLE 16

2 parts of the phosphite prepared in Example 7 and 1 part of 4,4'-isopropylidene diphenol were milled into 100 parts of SBR rubber (60% butadiene-40% styrene) to give a stabilized product.

What is claimed is:
1. A phosphite having one of the formulae

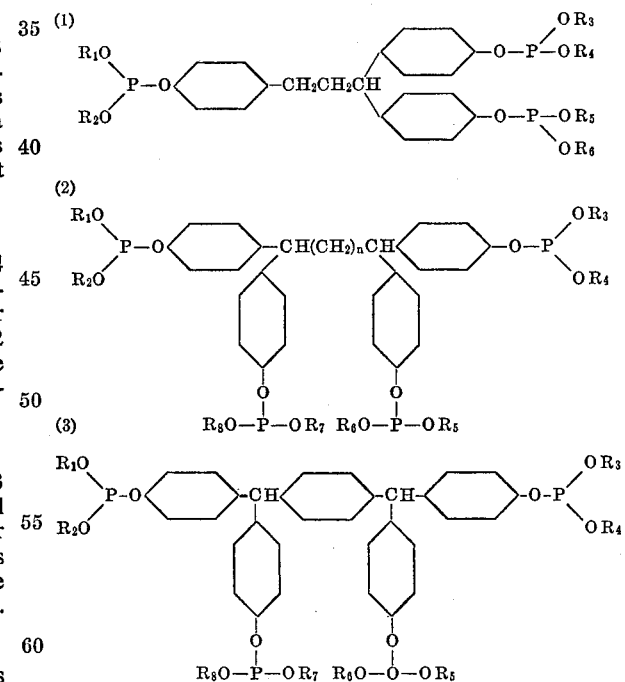

wherein $R_1$, $R_2$, $R_3$, $R_4$, $R_5$, $R_6$, $R_7$ and $R_8$ are selected from the group consisting of alkyl having 1 to 20 carbon atoms, alkenyl of 3 to 18 carbon atoms, phenyl, alkylphenyl where the alkyl is from 1 to 18 carbon atoms, allylphenyl, naphthyl, halophenyl and the monovalent residue of dihydric phenol or hydrogenated dihydric phenol having 1 to 2 rings, any substituent on the rings being hydrogen, lower alkyl or chloro, any link between two rings being $(X)_m$ where X is O, S, $SO_2$ or

where $R_9$ and $R_{10}$ are hydrogen, lower alkyl or phenyl and $m$ is zero or one, by removing one of the hydroxy groups, at least one but not all

groups can be replaced by hydrogen and $n$ is an integer from 0 to 10.

2. A phosphite according to claim 1 wherein none of the

groups are replaced by hydrogen.

3. A phosphite according to claim 1 wherein at least one of the

group is replaced by hydrogen.

4. A phosphite according to claim 1 having Formula 1.

5. A phosphite according to claim 4 wherein no

group is replaced by hydrogen.

6. A phosphite according to claim 5 where at least a part of the R groups are hydrogenated dihydric phenol residues.

7. A phosphite according to claim 6 wherein all of the R groups have the formula

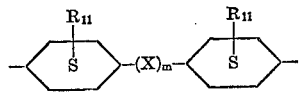

where $R_{11}$ is hydrogen or alkyl having 1 to 4 carbon atoms, X is O, S, $SO_2$ or

where $R_9$ and $R_{10}$ are hydrogen, lower alkyl or phenyl and $m$ is zero or one.

8. A phosphite according to claim 7 wherein $R_1$ through $R_6$ are all residues of 4,4′-isopropylidene dicyclohexanol.

9. A phosphite according to claim 1 having Formula 2.

10. A phosphite according to claim 9 wherein no

group is replaced by hydrogen.

11. A phosphite according to claim 10 wherein at least a part of the R groups are hydrogenated dihydric phenol residues.

12. A phosphite according to claim 11 wherein $n$ is 3.

13. A phosphite according to claim 12 wherein all of the R groups have the formula

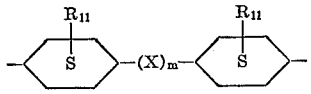

where $R_{11}$ is hydrogen or 1 to 4 carbon atoms alkyl, X is O, S, $SO_2$ or

where $R_9$ and $R_{10}$ are hydrogen, lower alkyl or phenyl and $m$ is zero or one.

14. A phosphite according to claim 13 wherein $R_1$ through $R_8$ are all residues of 4,4′-isopropylidene dicyclohexanol.

15. A phosphite according to claim 1 having Formula 3.

16. A phosphite according to claim 15 wherein no

group is replaced by hydrogen.

17. A phosphite according to claim 16 wherein at least a part of the R groups are hydrogenated dihydric phenol residues.

18. A phosphite according to claim 17 wherein all of the R groups have the formula

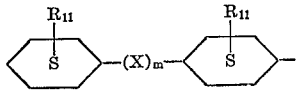

where $R_{11}$ is hydrogen or 1 to 4 carbon atoms alkyl, X is O, S, $SO_2$ or

where $R_9$ and $R_{10}$ are hydrogen, lower alkyl or phenyl and $m$ is zero or one.

19. A phosphite according to claim 18 wherein $R_1$ through $R_8$ are all residues of 4,4′-isopropylidene dicyclohexanol.

References Cited

UNITED STATES PATENTS 3,239,464　3/1966　Matson et al. ------ 260—930X

CHARLES B. PARKER, Primary Examiner

R. L. RAYMOND, Assistant Examiner

U.S. Cl. X.R.

260—45.95, 953